United States Patent [19]

Pioli

[11] 3,855,258

[45] Dec. 17, 1974

[54] PREPARATION OF TRANSITION METAL COMPLEXES

[75] Inventor: Alexander Joseph Peter Pioli, Runcorn, England

[73] Assignee: Imperial Chemical Industries, Limited, London, England

[22] Filed: July 6, 1973

[21] Appl. No.: 377,104

[30] Foreign Application Priority Data

July 13, 1972 Great Britain .................... 32808/72

[52] U.S. Cl. .......................... 260/429.3, 260/429.5
[51] Int. Cl. ............................................... C07f 7/00
[58] Field of Search ...................... 260/429.3, 429.5

[56] References Cited
UNITED STATES PATENTS
3,681,317  8/1972  Pioli et al. .................... 260/429.3 X OTHER PUBLICATIONS
Chem. Abstracts, Vol. 74, 31790q (1971).
Chem. Abstracts, Vol. 75, 6669v (1971).
Zucchini et al., J. Organometal Chemistry, Vol. 26, (3), pp. 357–372 (1971).
Chem. Abstracts, Vol. 73, 99032d (1970).
Chem. Abstracts, Vol. 74, 31312k (1971).
Chem. Abstracts, Vol. 67, 43901v (1967).
Chem. Abstracts, Vol. 67, 82229b (1967).
Chem. Abstracts, Vol. 69, 97200a (1968).
Chem. Abstracts, Vol. 72, 12845d (1970).

Primary Examiner—H. Sneed
Attorney, Agent, or Firm—Cushman, Darby & Cushman

[57] ABSTRACT

In the process for preparation of benzylic complexes of metals of Group IVa of the Periodic Table, for example zirconium tetrabenzyl, by reaction of a Group IVa metal compound with an ethereal solution of, for example, a benzylic Grignard reagent, the treatment, after the completion of the reaction, of the ethereal solution with a liquid hydrocarbon which is a solvent for the product benzylic complex and is a non-solvent for compounds of Group I and II metals present in the reaction system is found to give improved yields of the product.

5 Claims, No Drawings

PREPARATION OF TRANSITION METAL COMPLEXES

This invention relates to the production of transition metal complexes and, in particular, to the production of transition metal benzyls.

Our British Patent No. 1,265,747 describes and claims transition metal benzylic complexes of the general formula:

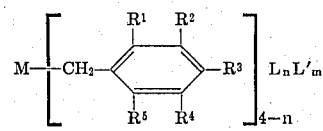

where M is a Group IV transition metal; $R^{1-5}$ are substituents, which may be the same or different; $n$ is an integer from 0 to 3, provided that when M = titanium, $R^{1-5}$ are not all hydrogen; L is an anionic ligand; L' is a neutral ligand; and $m$ is an integer from 0 to 2.

$R^{1-5}$ are preferably selected from hydrogen, alkyl groups containing one to six carbon atoms, cycloalkyl, halogen, and oxyalkyl which the alkyl group contains from one to six carbon atoms, but other organic groups are also suitable, including longer chain alkyl and oxyalkyl, alkaryl, aryl, aralkyl and aryloxy groups. Further, one or more pairs of groups $R^{1-5}$ may be linked to form cyclic structures, especially where two adjacent groups form a second aromatic ring which is coplanar with the ring already present.

These complexes, together with tetrakis (benzyl) titanium and its derivatives with neutral and anionic ligands, may be prepared by reacting a liquid solution or suspension of a Group IVa metal compound, particularly a salt, with a benzylic compound of a metal of Groups I-IV of the Periodic Table. Benzylic Grignard reagents (benzylic magnesium halides) are particularly suitable.

The benzylic compound may be preformed or may be generated in situ. Particularly when the benzylic compound is a Grignard reagent, this reaction is normally carried in solution or suspension in a liquid medium consisting of or including a significant proportion of an aliphatic, alicyclic or aromatic ether, for example, diethyl ether. The product benzylic complex is recovered by evaporation of the liquid, after filtration if necessary to remove insoluble by-products, for example magnesium halides.

We have now discovered a modification of the above process which can result in increased yields of transition metal complex.

According to the present invention we provide a process for the production of benzylic complexes of a metal of Group IVa of the Periodic Table by reaction of a Group IVa metal compound with an ethereal solution of a benzylic compound of a metal of Groups I and II of the Periodic Table in which, after completion of reaction, the ethereal solution is treated with a liquid hydrocarbon which is a solvent for the product benzylic complex and is a non-solvent for compounds of Groups I and II metals present in the reaction system.

(All references to the Periodic Table are to the version of the Periodic Table of the Elements printed inside the back cover of F A Cotton and G Wilkinson — Advanced Inorganic Chemistry, 2nd Edition (1966) Interscience Publishers, New York, London and Sydney).

The reaction between the Group IVa metal compound and the Group I or II benzylic compound is carried out in conventional manner, benzylic ligands being introduced into the Group IVa metal compound by substitution. The Group IVa metal compound is preferably a salt, for example the halide, and the benzylic compound is preferably a Grignard reagent.

The hydrocarbon solvent may be miscible or immiscible with the ether, but preferably is miscible with the ether.

The solvent is readily chosen on the basis of the relative solubilities of the product benzylic complex and the Group I or II metal compounds. Particularly if the solvent is ether-miscible, the boiling point should preferably be considerably higher than that of the ether, preferably at least 50°C higher, in order to aid separation of the ether and the hydrocarbon solvent. The hydrocarbon solvent may be aliphatic, for example heptane, iso-octane, or pentamethylheptane, or aromatic or quasi-aromatic, for example tetrahydronaphthalene (Tetraline) or decahydronaphthalene (Decalin).

After treatment of the ethereal solution with the hydrocarbon solvent, the resultant mixture is filtered to remove insoluble materials, for example magnesium halides, and the components may then be separated by conventional means. For example, if Decalin has been employed as the hydrocarbon solvent, the ether may be removed by evaporation (stripping or distillation) to leave a solution in decalin of the required transition metal benzylic complex.

The transition metal benzylic complex may be isolated by evaporation of the hydrocarbon solvent but it is frequently convenient to use the complex, for example as a polymerisation catalyst, in the form of its solution in the hydrocarbon solvent. Ethereal solutions, on the other hand, may interfere with the polymerisation reaction.

It will be appreciated that many transition metal complexes, or the benzylic compounds used as starting materials, are sensitive to air and water and the above operations should therefore be performed under substantially dry and oxygen-free conditions. Similarly the thermal stability of the product complexes may determine the upper temperature of reaction or of subsequent processing steps. With some complexes, temperatures below 0°C may be required.

The invention is illustrated by the following Examples, in which yeilds are quoted as mole % of the theoretical yield.

EXAMPLE 1

An ethereal solution of zirconium tetrabenzyl was prepared by taking a solution in diethyl ether of benzyl magnesium chloride at 0°C and adding s slight excess of zirconium tetrachloride over a period of 1 hour, while stirring the mixture. Stirring was continued for another 2 hours, during which time the temperature was allowed to rise to ambient temperature. An ethereal solution, prepared in the manner described above, was then used as starting material in the following processes.

All operations were performed under a nitrogen blanket.

A. Treatment of the Ethereal Solution with Decalin

Decalin was added to an ethereal solution containing zirconium tetrabenzyl, and the mixture was stirred thoroughly and filtered. The ether was removed by passing the mixture at a rate of 15 l hr$^{-1}$ over heat exchange coils at a temperature of about 50°C, while passing nitrogen (40–90 l. min$^{-1}$) through the liquid in counter-current fashion. Preferably two heat exchanger in series are employed.

| | |
|---|---|
| Yield of zirconium tetrabenzyl on Grignard reagent | 85% |
| Analysis of initial ether solution | Zr 3.68 g/l |
| | Cl 0.55 g/l |
| | Mg 0.04 g/l |
| Volume of ether solution | 1 l. |
| Volume of Decalin | 3 l. |
| Analysis of final decalin solution | Zr 4.72 g/l |
| | Cl 0.33 g/l |
| | Mg 0.03 g/l |
| Extraction efficiency | 90% |
| Overall yield | 63% |

B. Evaporation and Extraction of the Residue with Decalin

An ethereal solution contaig zirconium tetrabenzyl was filtered and the ether was removed in vacuo. The residue was extracted with Decalin, and the mixture was stirred for 2 and filtered.

| | |
|---|---|
| Yield of zirconium tetrabenzyl on Grignard reagent | 89% |
| Analysis of initial ether solution | Zr 6.2 g/l |
| | Cl 4.6 g/l |
| | Mg 1.8 g/l |
| Volume of ether solution | 1.5 l. |
| Volume of decalin | 2 l. |
| Analysis of final decalin solution | Zr 1.9 g/l |
| | Cl 0.28 g/l |
| | Mg 0.07 g/l |
| Extraction efficiency | 40.5% |
| Overall yield | 36% |

C. Recrystallisation from ether

An ethereal solution containing zirconium tetrabenzyl was decanted to separate it from precipitated magnesium chloride, the precipitate was washed three times with diethyl ether and all the washings were combined. The mixture was then filtered. The filtrate was concentrated by evaporation at reduced pressure and allowed to stand at −25°C.

After 48 hours, orange-yellow crystals of zirconium tetrabenzyl separated out. A sample of the crystals was dissolved in toluene, and analysis of the solution gave the following results.

Zr 12.48 g/l

Cl 0.21 g/l

Mg 0.045 g/l

After repeated crystallisations from the ether, the overall yield of zirconium tetrabenzyl was about 45% (calculated on the basis of initial Grignard reagent).

EXAMPLE 2

(All yields are based upon the benzyl chloride added)

A mixture of 530 g. magnesium turnings and 27 l. diethyl ether was stirred, and a solution of 2.3 l. benzyl chloride in 2 l. diethyl ether was added over 1½ hours, with water cooling. Benzyl magnesium chloride was obtained in 98% yield after decantation from residual solids.

1.25 Kg zirconium tetrachloride was added to the stirred Grignard reagent at 0°C over 1 hour. After addition was complete, 65 l. Decalin was added and the solution filtered. The ether was then removed by stripping to give a solution of zirconium tetrabenzyl in Decalin.

| Analysis: | concentration (g/l) | | | vol. (l) | Zr(Bz) Yield[4] |
|---|---|---|---|---|---|
| | Zr | Mg | Cl | | |
| initial Decalin ether solution | 4.09 | 0.09 | 0.55 | 80 | 72% |
| final Decalin solution | 4.99 | 0.01 | 0.17 | 60 | 66% |

EXAMPLE 3

A solution of benzyl magnesium chloride in diethyl ether was made by the method of Example 2 in 95% yield. A. illustrates the preparation of titanium tetrabenzyl according to the present invention, B. illustrates the preparation by recrystallisation for the purposes of comparison.

A. Preparation of Ti(Bz)$_4$ according to the invention

To the ether solution (500 ml.) containing 0.5 moles of Grignard reagent was added 13 ml. (0.125 moles) of TiCl$_4$ dissolved in 100 ml. Decalin, at −20°C over 1 hour. The mixture was allowed to warm to room temperature, and 900 ml. decalin was added. The solution was stirred for 2 hours, then filtered.

Nitrogen was then bubbled through the solution until all the ether was removed by evaporation (tested by infrared spectroscopy).

Analysis of the solution (720 ml.) showed a 39% yield of Ti(Bz)$_4$.

B. Preparation of Ti(Bz)$_4$ by alternative method

To the ether solution (500 ml.) containing 0.5 moles of Grignard reagent was added 13 ml. (0.125 moles) of TiCl$_4$ dissolved in 100 ml hexane over 1 hour at −78°C. The mixture was warmed to room temperature, more ether (125 ml.) was added, and the solution filtered.

Evaporation of the filtrate gave a deep red oil, which was taken up in hexane and the solution filtered. Recrystallisation from hexane gave crystals which were dissolved in toluene (1 l.).

Analysis showed a yield of 27% Ti(Bz)$_4$ based on benzyl chloride.

What we claim is:

1. A process for the production of a tetrabenzyl of a metal of Group IVa of the Periodic Table by reaction of a Group IVa metal salt with an ethereal solution of a benzylic compound of magnesium in which, after completion of the reaction, the ethereal solution is treated with a liquid hydrocarbon which is miscible with the ether, is a solvent for the product tetrabenzyl and is a non-solvent for the magnesium compounds present in the reaction system and has a boiling point at least 50°C higher than that of the ether, the process being performed under substantially dry, oxygen-free conditions and the ether being subsequently removed by stripping or distillation.

2. A process as claimed in claim 1 in which the benzylic compound of magnesium is a Grignard reagent.

3. A process as claimed in claim 1 in which the Group IVa metal salt is a zirconium halide.

4. A process as claimed in claim 1 in which the ether is diethyl ether and the liquid hydrocarbon is decahydronaphthalene.

5. A process for the production of zirconium tetrabenzyl in decalin solution according to claim 3 comprising the steps of
   a. preparing a solution of benzyl magnesium chloride in diethyl ether;
   b. reacting the solution with a zirconium tetrahalide;
   c. adding decahydronaphthalene to the solution;
   d. filtering from insoluble material, and
   e. removing the ether by stripping or distillation.

* * * * *